E. D. CAMPBELL.
POWER TRANSMISSION SYSTEM.
APPLICATION FILED JULY 28, 1916.
1,217,150.
Patented Feb. 27, 1917.
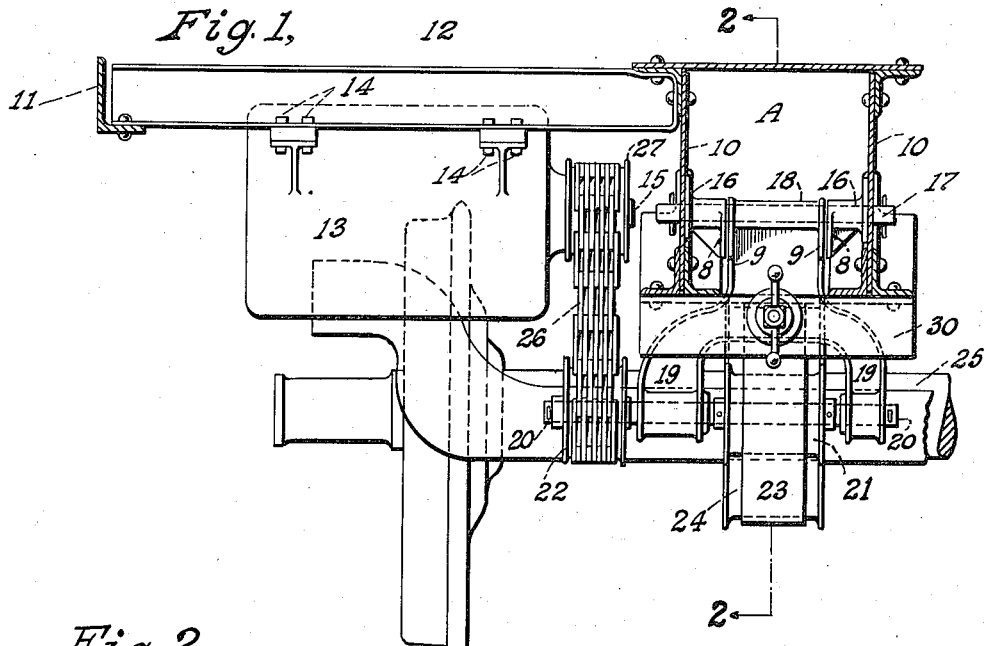
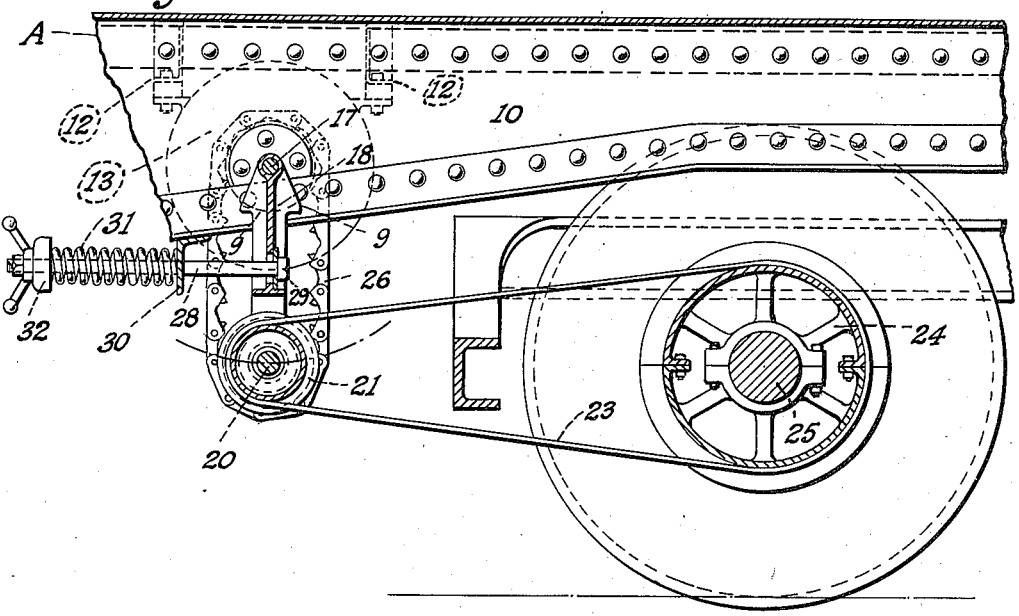
Inventor
Edmund D. Campbell
per Oscar Hochberg
Atty.

UNITED STATES PATENT OFFICE.

EDMUND D. CAMPBELL, OF ST. LOUIS, MISSOURI.

POWER-TRANSMISSION SYSTEM.

1,217,150.  Specification of Letters Patent.  Patented Feb. 27, 1917.

Application filed July 28, 1916. Serial No. 111,963.

*To all whom it may concern:*

Be it known that I, EDMUND D. CAMPBELL, residing at St. Louis, Missouri, and being a citizen of the United States, have invented certain new and useful Improvements in Power-Transmission Systems, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

One object of the invention is to provide power transmitting mechanism for railway cars by means of which power may be transmitted from the rotating axles of the truck to a generator rigidly fixed to the underframe of the car.

A further and important object is to provide a unitary power transmitting member swung from the car body and adapted to yield to the swiveling movements of the car truck.

It is the further object of this invention to provide a power transmitting mechanism in which the generator is relieved of the strain of the pulley drive mounted upon the trucks, and in which mechanism a generator of any available type may be employed.

Further advantages of the invention will be apparent from an inspection of the accompanying drawings in which is illustrated the preferred embodiment of my invention. Referring to the several views, Figure 1 is a vertical section taken transversely through a car underframe with my drive mechanism applied;

Fig. 2 is a vertical longitudinal section of the car underframe and a portion of the drive mechanism taken on line 2—2 of Fig. 1.

In the drawing, A indicates a car underframe of any suitable design in which the center sills are designated by the numeral 10; 11 indicating the side sills, and 12 designating the floor beams connecting the center and side sills.

The invention comprehends a generator 13 of any desired type rigidly secured to the floor beams 12 of the car underframe. The generator is fixed in position with its armature shaft 15 extending transversely of the car and is supported by means of bolts 14 rigidly securing same to the car body. The advantage of a fixed generator over the swinging type will be apparent when it is remembered that swinging generators are limited as to size on account of the excessive vibrations set up therein due to car movement; these vibrations are especially destructive to the swinging type of generator because of the violent and frequent strains imposed upon the bearings of the generator and upon the mechanism supporting the same. On the other hand, a generator fixed to the car body as above pointed out, may be of a capacity great enough to furnish power to other units in a train of cars, thereby eliminating the necessity of equipping each and every car with a power system.

To obtain the most beneficial results from a power system employing a fixed generator, some means must be found to relieve same of all pulley strains while permitting portions of the mechanism to yield to the movements of the axle pulley mounted upon the swiveling trucks of the car. These and other advantages are achieved by the employment of a unitary transmission member mounted upon the car body independently of the generator but coöperating therewith to the extent that the pulley shaft supported within and forming part of said unitary transmission member, will swing concentrically about the axis of the generator. This result is brought about by mounting said member upon a supporting shaft 17 journaled in bearings 16 secured to the center sills of the car underframe and axially alined with the generator shaft 15. The unitary member, comprising the yoke frame 18 carrying a belt driven shaft 20 journaled in the spaced arms 19 of the yoke, is suspended from shaft 17 and swings about the same and the generator shaft concentrically when influenced by the movements of the truck axle-pulley.

To prevent lateral rocking movement of the yoke frame induced by the swaying of the car body, the brackets 16 and the yoke frame 18, are provided respectively with laterally and downwardly extending wings 8 and 9 respectively. These wings offer extended bearing surfaces between the yoke frame and brackets 16 to overcome any tendency on the part of the yoke frame to lift from its supporting shaft 17 and relieves said shaft of the strains due to the rocking tendency of the yoke frame.

Secured to the driven shaft 20 of the swinging yoke frame between the arms 19 of said frame, is a pulley 21 having direct belt connection with axle-pulley 24 mounted upon the rotating truck axle 25, and another pulley 22 is secured to a portion of the shaft 20 extended beyond the yoke frame for belt connection with the generator pulley 27.

From the arrangement shown in the drawings it will be seen that with the axle-pulley belt 23 connecting said pulley with transmission shaft pulley 21 and the link belt 26 connecting transmission shaft pulley 22 with generator pulley 27, the relation between the extended transmission shaft 20 and the generator shaft 15 will be fixed, yet movable about the generator shaft without imposing the slightest strain upon the generator fastenings, although permitting said shaft 20 to respond to the swiveling movements of the axle-pulley 24.

To at all times maintain a uniform engagement of belt 23 and pulleys 21 and 24, a slack take-up device of any suitable type may be employed; that in the drawings is shown as comprising a tension bolt 28 extending through a spring stop angle 30 secured to the center sills and anchored to the swinging yoke frame 18 by the head 29, or in other ways; a spring 31 is mounted upon the bolt and held in position by any proper means, such as the butter fly nut and cap 32 as shown.

Due to the fact that the transmission shaft mechanism is not supported from the generator but from the underframe of the car, no special securing devices are required for fastening the generator to the car body, therefore a larger generator may be supported than would be possible were the generator and axle-pulley directly connected or the transmission shaft mechanism supported from the generator.

Another advantage derived from the use of a system employing the unitary transmission feature of my invention is that relating to the ease with which replacements or repairs may be made should breakdowns occur, and the readiness with which the parts comprising the unitary power transmitting member can be assembled at the shops and brought to the car and mounted upon the removable shaft 17 supported in the center sills.

A further advantage is that the fixed generator system lends itself admirably to the use of fixed conduits for the accommodation of the usual generator cable leads, and overcomes the difficulties inseparable from the flexible generator leads required with swinging generators.

What I claim is—

1. In a power transmission system for railway cars, the combination comprising a generator fixed to the car body, a driving pulley fixed to a rotating truck axle, and a swinging power transmission mechanism operatively suspended independently of said pulley and generator.

2. In a power transmission system for railway cars comprising a generator fixed to the car body and a swiveling axle pulley, and swinging unitary transmission mechanism between and connected with said axle pulley and generator, said mechanism being supported from the car body independently of said generator.

3. In a power transmission system for railway cars, a generator fixed to the body of the car, a unitary power transmission member supported from the car body independently of said generator but axially alined therewith and adapted to swing concentrically about the same, and an axle pulley, and means carried by said swinging transmission member operatively connected with said axle pulley and the generator.

4. In a power transmission system for railway cars including a generator fixed to the car body and an axle pulley, an independent unitary power transmitting member operatively suspended from the car body and adapted to yield to the movements of said axle pulley.

5. In a power transmitting system for railway cars including a generator fixed to the car body and arranged transversely of the car, an independently suspended unitary power transmitting member operatively connected to said generator, an axle pulley, and means connecting the transmitting member with the axle pulley, said unitary power transmitting member being adapted to yield to the movements of said axle pulley.

6. In a power transmitting system for railway cars including a generator fixed to the car body, and an axle-pulley, an independent unitary power transmitting member comprising a yoke frame swung from the body of the car in axial alinement with the generator and carrying a power transmission shaft journaled therein, a plurality of pulleys fixed to said shaft and having operative connection with said axle pulley and generator.

7. In a power transmitting system for railway cars including a generator fixed to the car body, and an axle pulley, an independent yoke frame swung from the body of the car and in axial alinement with the generator, a power transmission shaft journaled in said yoke frame, pulleys fixed to said shaft, connections between said pulleys, axle pulley and generator, said yoke frame being adapted to yield to the movements of the axle pulley.

8. In a power transmitting system for railway cars including a fixed generator, a removable shaft mounted in axial alinement with said generator, a unitary power transmitting member operatively suspended independently of said generator and comprising a yoke frame supported from said shaft, an axle pulley, a power transmission shaft journaled in the yoke frame and adapted to swing concentrically about the generator and the yoke frame supporting shaft, said yoke frame being adapted to respond to the movements of said axle pulley.

In witness whereof I have hereunto set my hand.

EDMUND D. CAMPBELL.